March 5, 1963 W. P. C. ROUSSEAU 3,080,382
PRODUCTION OF PHTHALIC ANHYDRIDE
Filed March 3, 1960
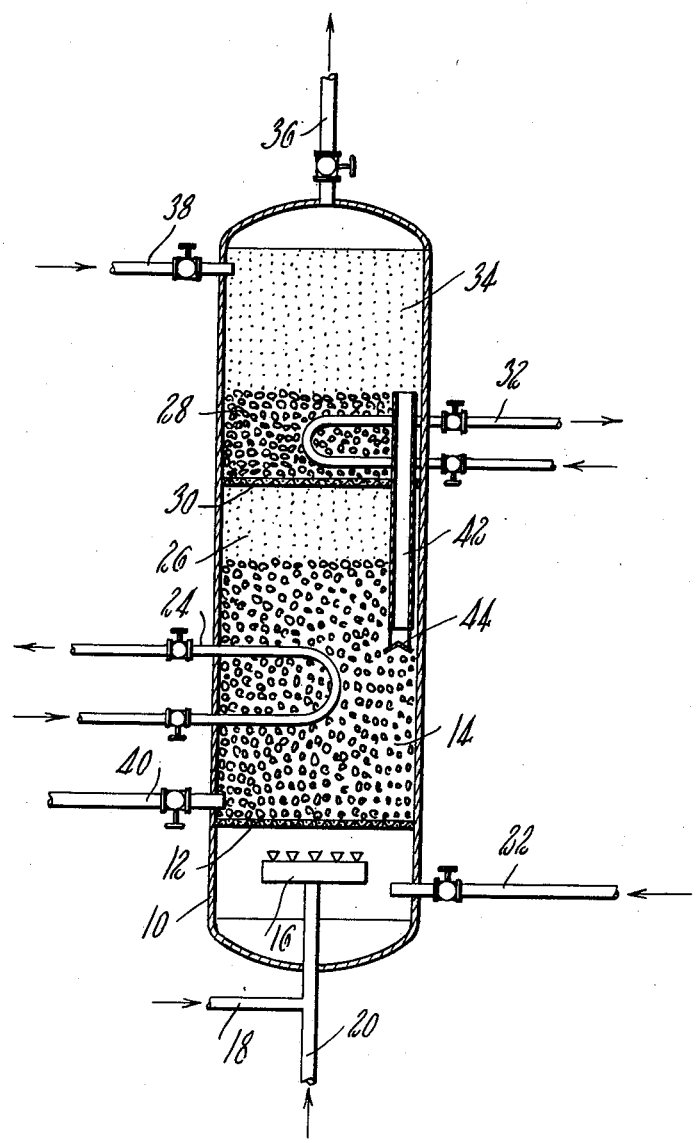

3,080,382
PRODUCTION OF PHTHALIC ANHYDRIDE
William P. C. Rousseau, Reading, Mass., assignor to The
Badger Company, Inc., a corporation of Massachusetts
Filed Mar. 3, 1960, Ser. No. 12,544
1 Claim. (Cl. 260—346.4)

This invention relates to a method and apparatus for carrying out a vapor-phase catalytic reaction in a bed of particulate catalyst maintained in a turbulent fluid condition by a stream of vaporized reactants within a reaction chamber.

In carrying out vapor-phase chemical reactions in a fluidized turbulent bed of particulate catalyst, it is important, in order to achieve optimum results, to control the temperature of the reaction within the catalyst bed within a desired range; and it is also important to be able to cool the reaction mixture promptly upon completion of the reaction to avoid decomposition of the product and/or further undesirable side reactions. The cooling or quenching of such reaction mixtures has presented considerable difficulties because of heat transfer from the reaction zone to the quenching zone as a result of the large amount of catalyst which is constantly being circulated within the fluid bed. Although it has been proposed to introduce baffles within the fluid bed in an effort to control circulation of the catalyst particles, such an expedient necessarily impedes to some extent the flow of the reactant stream through the catalyst bed and thus tends to prevent the development of uniform contact between all portions of the reactant stream and the particulate catalyst. Physical separation of the cooling or quenching coils from the dense-phase catalyst bed in an effort to reduce heat transfer from the reaction zone leads to difficulty in maintaining adequate control as well as to the necessity for undesirably large cooling surfaces which are subject to fouling by catalyst fines carried by the vapor stream. Injection of a cool gas or vapor into the product stream in order to quench the reaction mixture requires a substantial power consumption as well as the necessity for increasing the size of the filtering system, condensers, etc., to handle the increased volume of gas or vapor in the system.

One object of the present invention is to provide an improved method and apparatus for temperature control in a fluid bed catalyst reaction system which is inexpensive and simple in operation.

Another object is to provide a method and apparatus for controlling the temperature of the main reaction bed in such a system substantially independently of the temperature of a subsequent quenching operation with a minimum of heat transfer from one to the other.

Still another object is to provide a method and apparatus for positive control of quenching time and temperature by means of a small cooling surface with a high heat-transfer coefficient, leading to elimination of fouling and an increase in product yield and purity.

Other and further objects will be apparent from the drawing and from the description which follows.

In the drawing:

FIG. 1 is a schematic diagram of one embodiment of the present invention.

As shown in the drawing, there is provided a generally vertically arranged reaction chamber 10 which is provided with a transverse reticulate grid 12 which serves to maintain in position a dense-phase catalyst bed 14. The dense-phase catalyst bed is maintained in a turbulent fluidized state by the passage upward through it of a stream containing the reactants in vapor or gaseous form. Means for introducing the reactants is provided adjacent the bottom of chamber 10 in the form of a distributor 16 to which the reactants are supplied by means of lines 18, 20. A supplemental inlet line 22 may be provided for introducing a third or supplemental reactant if desired or for introducing an additional supply of one of the two reactants flowing through distributor 16. A temperature control coil 24 is disposed within the dense-phase catalyst bed 14 through which any desired or conventional heating or cooling liquid may be circulated in the usual manner in order to maintain the temperature within the range necessary to promote the desired reaction.

In one embodiment of the present invention, the reaction may be the exothermic vapor-phase oxidation of a vaporizable organic material such as naphthalene or orthoxylene to form phthalic anhydride by means of air or oxygen, in which case the catalyst used may be vanadium pentoxide. It will be understood, of course, that the use of the present invention is not confined to such an oxidation reaction, but may be employed in a variety of exothermic or other vapor-phase chemical reactions.

Immediately above the dense-phase catalyst bed 14 in reaction chamber 10 is a dilute-phase catalyst bed 26 where separation of the catalyst particles from the stream of reaction mixture occurs. The high density within bed 14 together with the rapid and turbulent circulation of catalyst particles therein provide for a high heat-transfer coefficient between cooling coil 24 and the vapor-phase reaction mixture, facilitating the maintenance of uniform temperature conditions through the dense-phase bed. The low density within dilute-phase bed 26, on the other hand, provides poor heat-transfer characteristics, effectively thermally isolating dense-phase bed 14 from the secondary or quenching dense-phase catalyst bed 28 supported on grid 30 above dilute-phase bed 26. A temperature-control or cooling coil 32 is disposed within quenching bed 28 through which any desired heating or cooling medium may be circulated. The supply of heating or cooling medium for coil 32 may be and preferably is completely independent of the supply of heating or cooling medium for coil 24, thus making it possible to maintain the temperature within quenching bed 28 at a lower level than within reaction bed 14. A second dilute-phase catalyts bed 34 occurs above bed 28 within which the catalyst particles are disengaged from the stream of reaction mixture. The stream of reaction mixture containing the desired product flows upwardly through main outlet 36, whence it may pass to any conventional filter system to remove entrained catalyst particles. Line 38 is provided near the upper end of reaction chamber 10 to permit the introduction of fresh or make-up catalyst either continuously or at any desired intervals while another line 40 may be provided adjacent the bottom of reaction bed 14 to permit unloading of exhausted catalyst, either continuously or at any desired intervals.

A conduit or standpipe 42 is generally vertically arranged within reaction chamber 10 and has its upper end located adjacent the upper portion of quenching bed 28 with its lower end opening into reaction bed 14. Baffle 44 is mounted in spaced relation beneath the lower end of conduit 42 to obstruct the upward flow of reaction mixture from entering the conduit. Conduit 42 serves as an overflow pipe to control the depth of quenching bed 28 and to return excess catalyst to reaction bed 14 in the event that the depth of quenching bed 28 becomes too great. This device automatically compensates for any excessive carry-over of catalyst particles from reaction bed 14 to quenching bed 28 and ensures a stable system.

Because of the high density and turbulence in quenching bed 28, there is provided a high heat-transfer coefficient between coil 32 and the stream of the product-containing reaction mixture. This makes it possible to quench the reaction mixture rapidly and thoroughly, minimizing any side reactions or decomposition which might otherwise occur and making it possible to employ a relatively small cooling surface for coil 32 and minimum removal of heat because of the thermally insulating nature of dilute-phase bed 26 which separates quenching bed 28 from reaction bed 14.

While the physical dimensions of the reaction chamber and of the catalyst beds will vary, of course, depending upon the nature of the reaction and of the catalyst as well as upon the throughput desired, it has been found that in the case of oxidation of naphthalene to phthalic anhydride using vanadium pentoxide catalyst, the feed rate for satisfactory results is from 0.01 to 0.5, preferably from 0.03 to 0.06, parts of naphthalene by weight per hour per unit weight of catalyst. The ratio of air to naphthalene by weight may be from 8 to 30, preferably from 10 to 15. While pre-heating of the mixture of air and naphthalene is desirable, it is not essential, and the naphthalene may be introduced into the reaction chamber either as a liquid or as a vapor. The rate of flow of the stream of reactants through the catalysts beds may be from 0.2 to 3.0 feet per second, preferably from 0.5 to 2.0 feet per second, with a contact time in reaction bed 14 from 5 to 30 seconds, preferably from 10 to 20 seconds. The reaction bed or dense-phase catalyst bed 14 consequently may be from 5 to 40 feet in depth, preferably from 10 to 30 feet deep, depending upon the rate of flow and contact time employed.

The quenching bed or secondary dense-phase catalytic bed 28 is from 3 to 20 feet in depth, preferably from 5 to 14 feet, so as to provide a contact time from 3 to 15 seconds, while the dilute-phase bed 26, serving as a thermoinsulating barrier between bed 14 and bed 28, may be from 1 to 20 feet deep, preferably from 10 to 15 feet, to provide a transit time of 1 to 15 seconds for the stream of reaction mixture.

The temperature within dense-phase catalytic reaction bed 14 is maintained from 300° to 450° C., preferably about 350° C., by means of cooling medium circulated through cooling coil 24, while the flow of cooling medium through coil 32 is adjusted to maintain a temperature within quenching bed 28 of 200° to 320° C., preferably about 250° C.

It will be understood that one or more overflow conduits 42 may be employed as desired and that they may be located either circumferentially or centrally of reaction chamber 10, or they may be located externally of the chamber, in order to maintain the desired depth in quenching bed 28.

Yields of phthalic acid in excess of 90 pounds per 100 pounds of naphthalene feed may be obtained by means of the present invention. Similarly improved results are obtainable in the oxidation of ortho-xylene to phthalic acid and in the case of other exothermic vapor-phase reactions.

Although specific embodiments of the invention have been described herein, it is not intended to limit the invention solely thereto, but to include all of the obvious variations and modifications within the spirit and scope of the appended claims.

What is claimed is:

The method of carrying out a vapor-phase reaction which comprises passing a stream containing naphthalene vapors and from 8 to 30 times by weight of air upwardly through a first dense phase of particulate vanadium pentoxide catalyst maintained in a turbulent fluid bed and controlling the temperature within said dense phase at a level from 300° to 450° C. to promote said reaction, passing said stream from said dense-phase bed through a dilute-phase bed of said catalyst above said first dense-phase bed, and subsequently passing said stream through a second dense-phase bed of said catalyst above said dilute-phase bed while controlling the temperature in said second dense-phase bed at a level from 200° to 320° C. which is below that in said first dense-phase bed, the rate of flow of said stream being controlled to provide a time of contact with said first dense phase of 5 to 30 seconds, a time of contact with said dilute-phase bed of 1 to 15 seconds, and a time of contact with said second dense phase of 3 to 15 seconds, and removing catalyst from the upper portion of said second dense-phase bed when the depth of said bed exceeds a predetermined value and returning said catalyst to said first dense-phase bed.

References Cited in the file of this patent
UNITED STATES PATENTS

| | | |
|---|---|---|
| 1,515,299 | Downs et al. | Nov. 11, 1924 |
| 2,537,568 | Beach | Jan. 9, 1951 |
| 2,735,802 | Jahnig | Feb. 21, 1956 |
| 2,783,249 | Jaeger | Feb. 26, 1957 |
| 2,989,544 | Saunders et al. | June 20, 1961 |